United States Patent [19]

Hampel et al.

[11] 3,922,536

[45] Nov. 25, 1975

[54] MULTIONOMIAL PROCESSOR SYSTEM

[75] Inventors: Daniel Hampel, Westfield; Richard William Blasco, Flemington, both of N.J.

[73] Assignee: RCA Corporation, New York, N.Y.

[22] Filed: May 31, 1974

[21] Appl. No.: 475,132

[52] U.S. Cl. .................................. 235/152; 235/197

[51] Int. Cl.² ........................................ G06F 15/34

[58] Field of Search ........... 235/156, 159, 160, 164, 235/168, 175, 152, 197

[56] References Cited

UNITED STATES PATENTS

| | | | |
|---|---|---|---|
| 3,604,909 | 9/1971 | Vogel et al. | 235/175 |
| 3,619,583 | 11/1971 | Arnold | 235/152 |
| 3,697,734 | 10/1972 | Booth et al. | 235/164 |
| 3,818,202 | 6/1974 | Ellison | 235/156 |

*Primary Examiner*—David H. Malzahn
*Attorney, Agent, or Firm*—Edward J. Norton; Carl M. Wright

[57] ABSTRACT

System using intercoupled pluralities of cells, each cell having three input nodes for producing an output signal equal to the product of two of the input signals added to the third input signal with addressable memories and controls for altering the intercoupling among cells, for calculating the value of high order, multivariable polynomials.

3 Claims, 8 Drawing Figures

MULTIONOMIAL PROCESSOR SYSTEM

The invention herein described was made in the course of or under a contract or subcontract thereunder, with the Department of the Air Force.

BACKGROUND OF THE INVENTION

The sciences of cybernetics and digital computers overlap in many areas, notably where neuron-like elements are arrayed such as in the perceptron. The class of problem solved by such devices are or usually can be reduced to high order polynomials with several variables.

Problems requiring the solution of several high order polynomials can be handled by suitably programming a general purpose digital computer. The time required for a solution, however, increases rapidly with an increase in the number of variables or the order, or both.

Array processors have been developed to shorten the solution time for problems involving vector or matrix calculations. These array processors usually substitute hardware (logic networks) for many of the programmed functions such as address generation of elements being processed in the arrays, cross multiplying, and summing. These array processors tend to be inefficient when coefficients are to be changed during solution as when performing iterative calculations or when being used to synthesize adaptive systems for neuromiming.

This disclosure describes an invention which is more efficiently adapted to the rapid solution of highorder multivariable polynomials and which can be implemented to produce machines with high level artificial intelligence.

BRIEF SUMMARY OF THE INVENTION

Input signals are applied to a plurality of cells, each cell having three input terminals. The cells produce an output signal which is the product of two input values added to the value of a third. The input values are coupled to the desired inputs by selectors which are responsive to control signals.

DETAILED DESCRIPTION OF THE INVENTION

To produce polynominal output digital values, binary signals representing the values of the coefficients and variables can be manipulated in parallel or serially. Parallel digital processing is faster than serial but the level of hardware complexity increases; therefore, even though serial processing is slower, the reduction of hardware often makes it more desirable than parallel processing. Embodiments of the invention will be described showing both serial and parallel processing to illustrate the adaptability of the invention to either mode.

Figure 1:
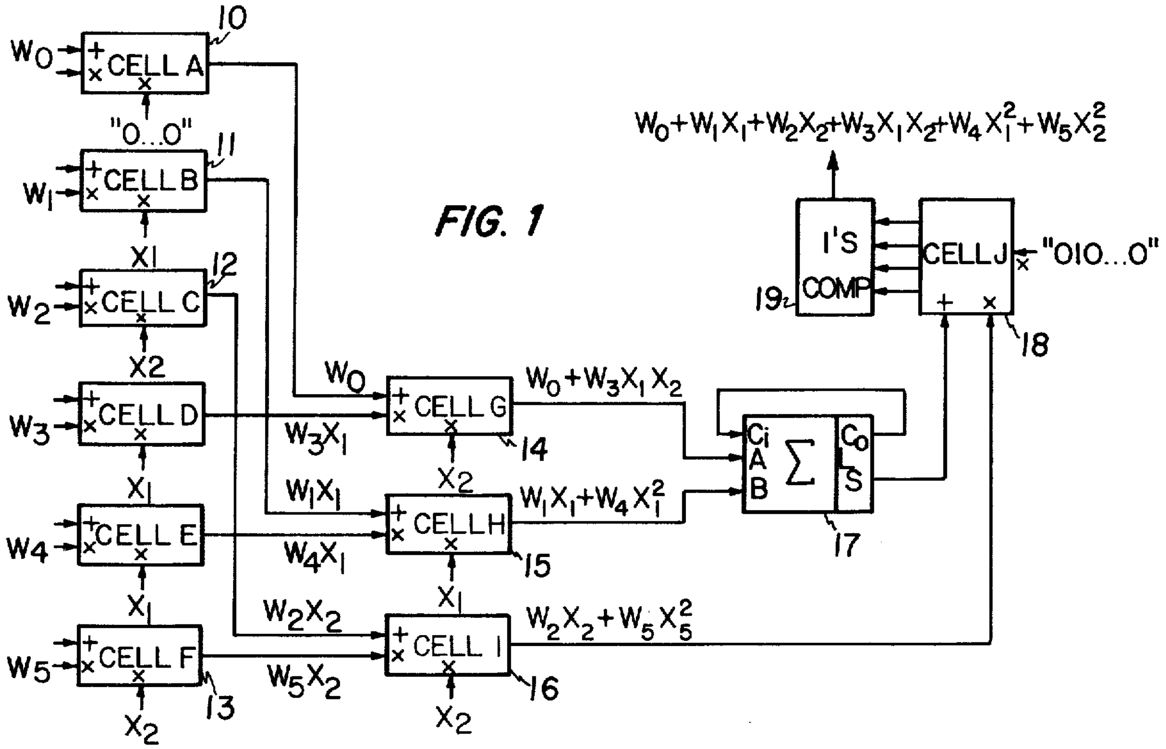
FIG. 1 is a block diagram of an embodiment of the invention employing fixed point arithmetic.

The circuit shown in FIG. 1 is an embodiment of the invention employing serial data processing. Each cell shown in FIG. 1 has three input terminals and an output terminal. The input terminals accept a multiplier (MIER), a multiplicand (MAND), and an addend (ADD). The output signal of a cell is the product of the MIER and MAND plus the ADD. Functionally, this can be implemented by using the ADD value as the initial partial product. Each cell also has a clock input which is not shown for purposes of clarity. (The purpose of the clock is to synchronize the shifting and operation of the various bits through each cell.)

Some of the cells do not utilize all three inputs. For example, the cell A 10 uses only the ADD input; the other two inputs are zero. Therefore, the output signal of the cell A 10 is the input value $W_0$. The cell B 11 does not use the ADD input but signals representing $X_1$ and $W_1$ are coupled to the MAND and MIER inputs so that the output signal from the cell B 11 is $X_1$ times $W_1$.

Devices for implementing the cells are well known in the art. An example of a six bit (five data bits plus sign) cell is described in "Digital Filter Multiplier II Array," *Product Description—Digital Filters*, Collins Radio, Inc., Oct. 1971, pages 4–6. The referenced article discusses the construction and use of cells for any required number of bits.

Returning to FIG. 1, a second plurality of cells such as the cells G, H, and I 14–16 are shown with some of their inputs coupled to the output signals of the previously described cell array and with other inputs coupled to the input values.

The cell G 14 receives one of the input signals $X_2$ and one of the output signals from the cell D ($W_3X_1$), forms their product, and adds $W_0$ to produce the polynomial value $W_0 + W_3 X_1 X_2$. Similarly, the cell H 15 receives the input variable $X_1$ and the output signal of the cell E ($W_4X_1$), forms their product, and adds the output value of the cell B 11 ($W_1X_1$) to produce the polynomial value $W_1X_1 + W_4X_1^2$. The cell I 16 operates in a similar fashion as shown in FIG. 1.

The output signals of the cell G 14 and the cell H 15 are applied as input signals to an adder 17. The output signal of the adder 17 and the output signal of the cell I 16 are input signals to the cell J 18. The MIER input to the cell J 18 is a binary one. The output signal of the cell J 18 is coupled to a one's complementer 19 to produce the result in the proper sign-magnitude form. A one's complementer simply inverts the value of each bit. The output signal of the one's complementer 19 is an example polynomial $$W_0 + W_1X_1 + W_2X_2 + W_3X_1X_2 + W_4X_1^2 + W_5X_2^2.$$

Figures 2, 3:
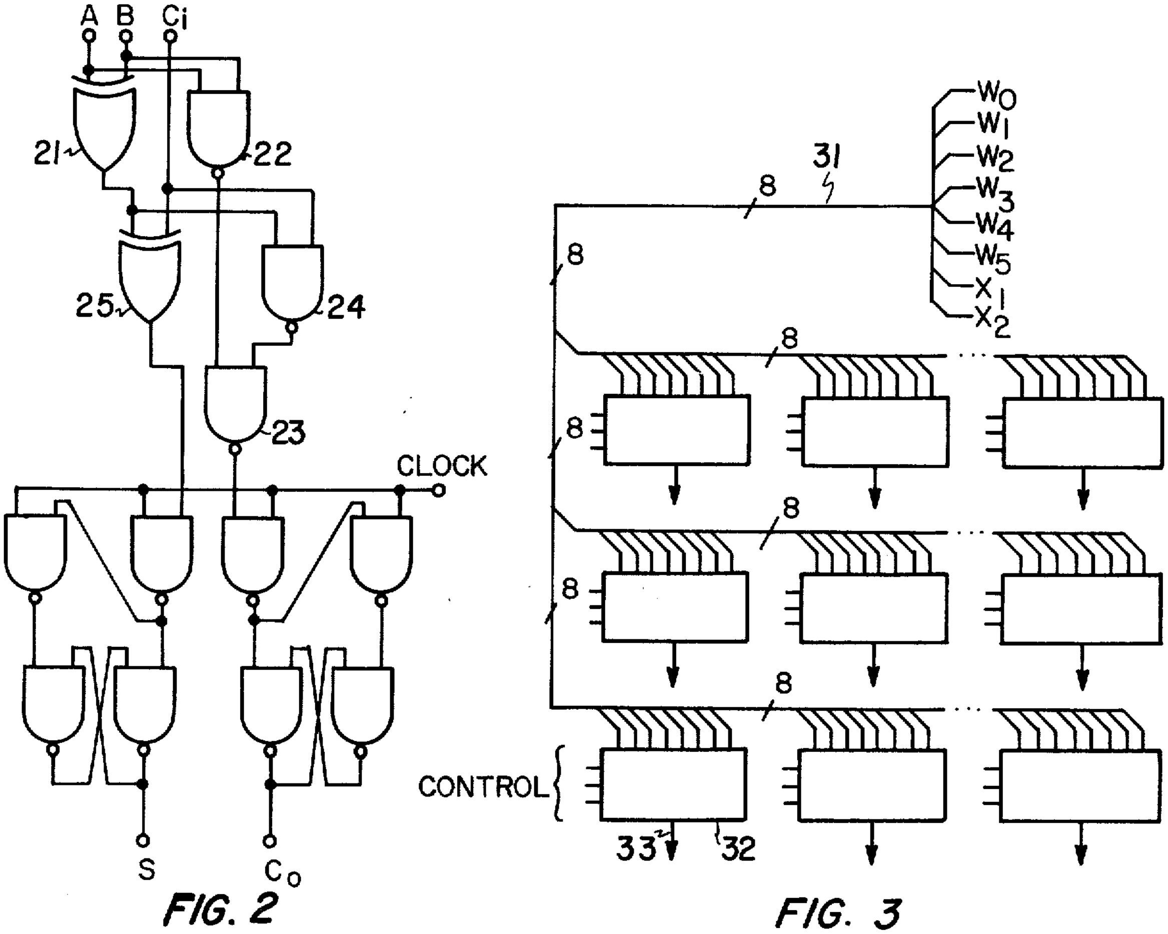
FIG. 2 is a logic diagram of an adder useful in the invention.
FIG. 3 is a block diagram illustrating a multiplexor circuit for controlling signal intercoupling.

FIG. 2 illustrates a latching adder useful as the adder 17 of FIG. 1. The input bits A and B are coupled to an Exclusive-OR (XOR) gate 21 and to an NAND gate 22. The XOR gate 21 and the NAND gate 22 form a half-adder. The sum output of the half-adder from the XOR gate 21 and the carry-in ($C_i$) bit are applied to another half-adder formed by an XOR gate 25 and a NAND gate 24. The output signals of the NAND gates 22 and 24 are ORed by a NAND gate 23 to produce a carry-out ($C_o$) signal. The $C_o$ signal from each bit position is the $C_i$ signal for the next more significant bit.

The sum output signal from the XOR gate 25 and the $C_0$ signal from the NAND gate 23 are stored in latches in response to a clock input signal. The latches are well known in the art and need not be described in detail.

Summarizing the system illustrated in FIG. 1, there are ten cells arranged to implement a general second order polynomial in two variables. The cell A 10 functions as a m-stage delay register, where *m* is the number of bits used to represent values, i.e., *m* is the word size. The cells B through F function as multipliers, and the cells G through I function as adder/multipliers. The cell J 18 functions as an adder-register. The bits of all six terms of the example polynomial are generated in parallel and the bits of equal significance are matched so that a single clock can be used for the entire processor.

In most applications, only *m* of the most significant bits of the output polynomial would be stored. Truncation of the least significant bits and conversion to sign-magnitude form through use of a ones complementer results in plus or minus one least significant bit error in the output value.

As system such as described and shown in FIG. 1 can be used with a multiplexor to solve general polynomials. An example of the usefulness of solving a general polynomial is where $W_0$ through $W_5$ are given and estimates of $X_1$ and $X_2$ are made as the initial inputs to the system. Subsequent output values are compared and the results used to modify the values of $X_1$ and $X_2$ so that the output values of each successive computation is closer to that of the preceding computation. When the values of two succeeding computations are equal, the values of $X_1$ and $X_2$ will be one of the solutions to the polynomial equation. In order to provide more flexibility for the system shown in FIG. 1, a switching system can be provided to couple the binary numbers of each value to a selected input of a selected cell.

A switching system useful with the circuit of FIG. 1 is shown in detail in FIG. 3. The lines carrying the signals representing the various W-values and X-values to be applied to the cells form a cable 31 such that each signal is applied to one of a plurality of multiplexors. Typically, there is a multiplexor for each input terminal of each cell so that for the circuit in FIG. 1, the number of multiplexors in FIG. 3 would be 30, only nine of which are shown for purposes of illustration. A typical multiplexor 32 receives a number of input signals and a control signal or signals which operate to couple one of the input signals to the output terminal 33. Such devices are well known in the art; for example, the circuit of FIG. 3 can be implemented using type Ser. No. 74253 integrated circuits (Signetics, National, or Texas Instruments). The application notes for the integrated circuits show the operation and connections needed to operate as multiplexors.

The multiplexor array shown in FIG. 3 can be associated with the inputs to the cells of FIG. 1 as follows. The cells in the first column are coupled to the inputs of the cell A; those of the second column, to the cell B; and so on. The last (tenth) column is coupled to the inputs of the cell J. The first row outputs are coupled to the ADD inputs of each cell; the second row, to the MAND input terminals; and the third row, to the MIER input terminals.

Each multiplexor has a different set of control signals. The control signals are binary signals whereby the binary number appearing on the control lines indicates which of the eight input lines are to be coupled to the output line. The control signals can be supplied from a read only memory (ROM), manually set switches, or by means of some other control device. The details of such a system for providing the control signals is not essential to an understanding of the invention and is not described here in detail.

The system of FIG. 1 with its required controls is referred to herein as an element. Pluralities of elements can be coupled together to solve more complicated problems than a single element is capable of solving.

A floating point embodiment of an element will be described using parallel processing and stored values. Such a system is illustrated by the block diagram of FIG. 4.

A controller 41 interprets macro-instructions from a host computer (not shown), and manipulates data flow within and between the elements to execute the macro-instructions. The macro-instructions include the basic polynomial set, connectivity data, and direct array control instructions, e.g., LOAD, EXECUTE, FETCH, INTERRUPT, and so on.

A random-access control memory 43 stores the computer macro-instructions. A W-memory 45 stores the polynomial weights and an X-Y memory 47, the array input and element output variables. A read-only memory 49 (ROM) contains the detailed elementary operations (EO) that control the execution of the macro-instruction repertoire of the element.

An intra-element bus 491 provides flexible data routing within the element, while one or more interelement buses 410 are used to move data between elements. This busing arrangement allows a single element to simulate an entire array, allows several elements to operate in parallel to improve processing speed, and allows cascaded layers of elements to form a pipeline array. Cross-marked blocks such as the block 412 represent gates between various parts of the element and the buses and are controlled by the bus control output signals of the controller 41.

The element processing cycle can be divided into three phases: the input phase, the execute phase, and the output phase.

During the input phase, the host computer (not shown) defines the array structure to be simulated by loading the appropriate macro-instructions into the control memory 43. Array parameters are defined by loading the polynomial weights into the W-memory 45. Array input values are loaded into the X-Y memory 47. Loading can be performed in one of several ways which are well known in the art and need not be explained in detail for an understanding of this invention. After loading, the computer provides an EXECUTE command to the controller 41.

During the execute phase, the controller 41 sequentially steps through the control memory 43, obtaining the polynomial type to be implemented at a given array node and obtaining the addresses where the node inputs are to be obtained. Since the node input addresses can represent any previously generated value, complex flexibility in array connectivity is achieved. (If a node input represents a value stored in the X-Y memory of another element in multi-element arrays, the inter-element buses 410 are used to access this data.)

Once the polynomial to be implemented at a given node is determined, the appropriate section of the EO memory 49 is sequentially accessed to yield the detailed elementary operations to compute the desired polynomial's value. The controller 41 interprets these elementary operations and provides the necessary data routing and clock signals to an arithmetic processor 411 to calculate the polynomial. The controller 41 stores the output result sequentially in the X-Y memory 47. (If this output is needed by another element in multi-element arrays, the controller 41 will gate the data from the X-Y memory 47 to the inter-element bus 410.)

The controller 41 then increments the address to the control memory 43 to read the macro-instructions for the next array node and repeats the above sequence for each node of the array. The controller 41 continues until a certain polynomial select code is detected. This code is interpreted as a HALT instruction, and when all of the element controllers have detected this code, the execute phase is terminated and a READY signal is transmitted to the host computer.

At the completion of the execute phase, all of the array output and intermediate values are stored in the X-Y memory 47 of the element. The host computer can then access the array output values. This completes the processing cycle.

The host computer may start a new cycle by loading a new set of input values into the arrays. If the array is being adapted, or "trained", a new set of polynomial weights and connectivity is loaded into the W memory 45 before the execution.

The details of the various components of the system of FIG. 4 will now be described in detail.

Figure 4:
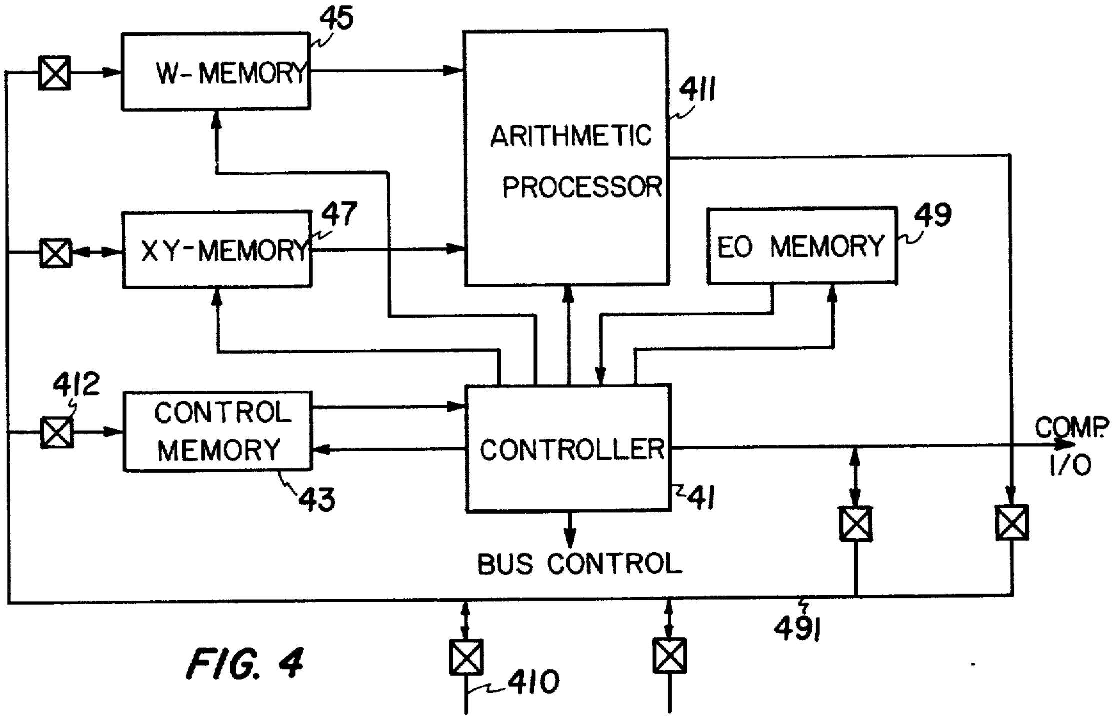
FIG. 4 is a block diagram of an element according to the invention.
Figure 5:
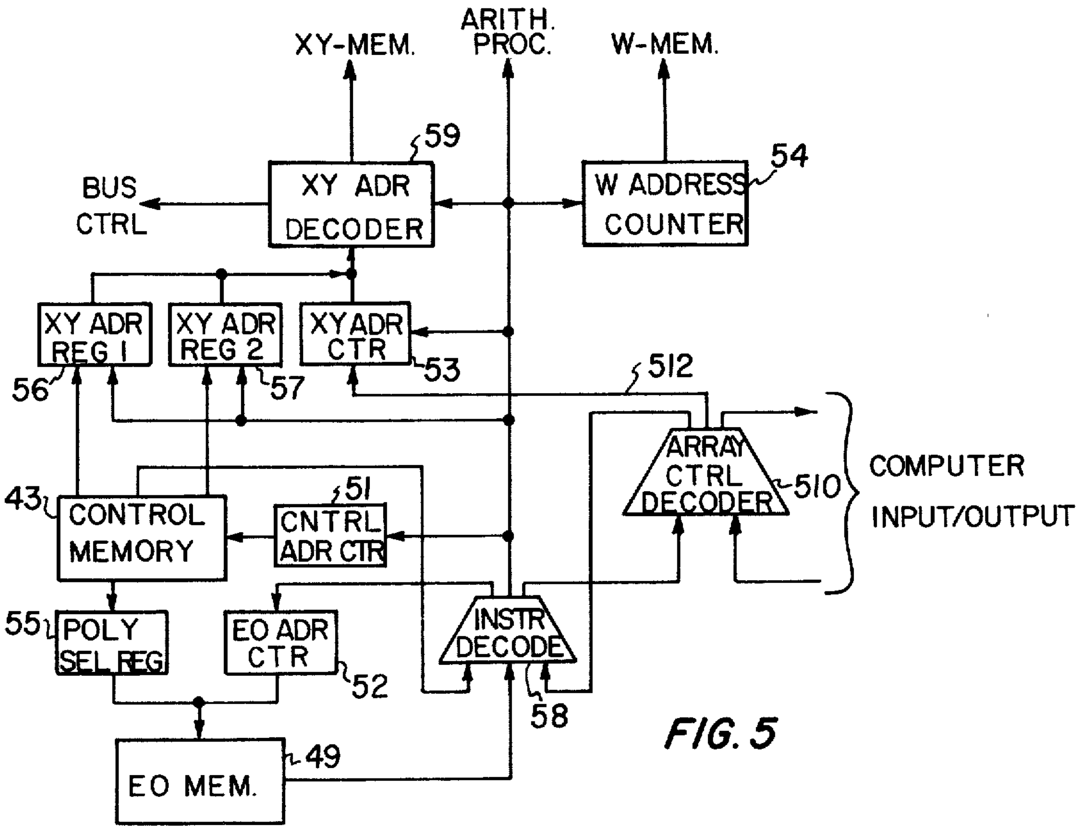
FIG. 5 is a block diagram of a controller.

A block diagram of the controller 41 of FIG. 4 is shown in detail in FIG. 5. Four address counters 51–54 provide sequential access to the control memory 43, the EO memory 49, the X-Y memory, and the W memory. The X-Y address counter 53 can be preset via a bus 512 to a desired address to speed access to element output values.

Registers 55–57 store the polynomial select code for the array node being implemented, and store the addresses of two input variables, respectively. The contents of the polynomial select register 55 serve as part of the EO memory address, while the EO address counter 52 provides the rest of the address. In this way, the polynomial select register 55 selects the proper segment of the EO memory, and the EO address counter 52 sequentially steps through that segment to calculate the polynomial.

An instruction decoder 58 converts macro-instructions from the host computer via the control memory 43 and elementary operations from the EO memory 49 into clock and data flow control signals for the arithmetic processor, reset and preset commands for the control logic address counters 51–54, and address select information for an address decoder 59.

The address decoder 59 selects the X-Y address from either of the two registers 56 or 57 (normally used to access polynomial input variables) or from the X-Y address counter 53 (used to store sequentially the output variables and to access the output values requested by the host computer). The selected address is gated to the X-Y memory address register if the address represents a memory location within the given element, or the address is converted into an enable signal to activate the proper inter-element bus if the X-Y data originates from or is to be sent to another element.

An array control decoder 510 detects and decodes direct array control macro-instructions from the computer and transmits the ready signal to the computer when a code is detected on the polynomial select lines that indicates the operations are to be halted.

In FIG. 4 and 5, a ROM 49 is shown for the EO memory. The ROM provides a fixed repertoire for the element. Use of a fixed repertoire simplifies programming of the host computer, since detailed EO's do not have to be provided to the element. An alternate approach would be to merge the control memory 43 and the EO memory 49 to allow the use of subroutines in the host computer macrosequence. With this alternate approach, the polynomial repertoire can be changed by the host computer to optimize the element for a given task. For purposes of illustration, the fixed repertoire approach is described.

Decoders such as the address decoder 59, the instruction decoder 58 and the array control decoder 510 are well known in the art and can be implemented by use of integrated circuits. For example, one type of decoder is shown and described in the application notes for type Ser. No. 74155 (Signetics, National, and Texas Instrument). Address counters such as the X-Y address counter 53 can be implemented using commercially available integrated circuits such as the type Ser. No. 74197 (Texas Instruments). Other registers such as the polynomial select register 55 can be implemented using a number of flip-flops equal to the number of bits to be stored. The circuit described in FIG. 5 can be implemented by one of ordinary skill in the art from the above description.

Figure 6:
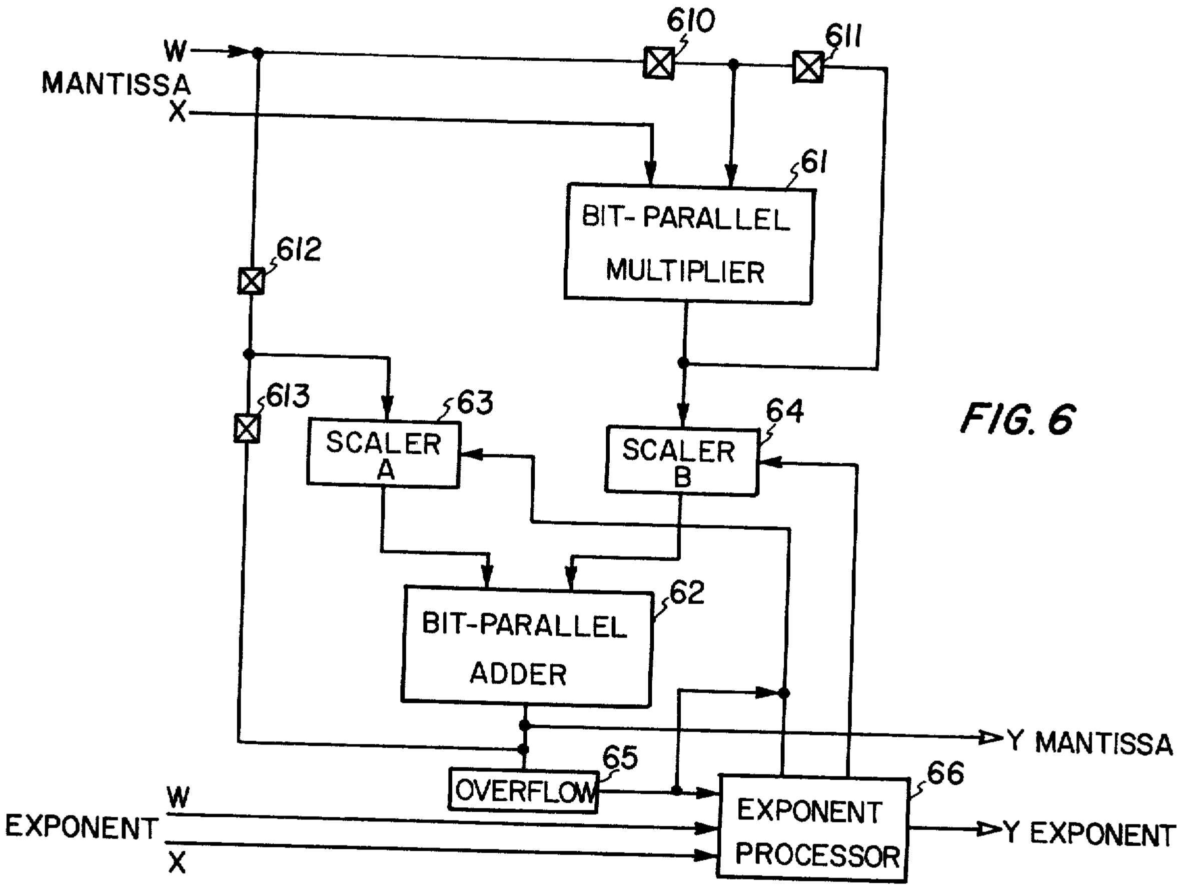
FIG. 6 is a block diagram of a floating point bit-parallel arithmetic processor.

The arithmetic processor 411 in FIG. 4 is shown in detail in FIG. 6. The description of the arithmetic processor will be based on a floating point, parallel bit data organization. For fixed-point calculations, a bit-parallel multiplier 61 and a bit-parallel accumulator (in the adder 62) form the processor with gating to allow calculation of second- and third-order product terms. Latches (not shown) at the multiplier 61 and adder 62 output ports provide synchronous operation of the processor. For floating-point calculations, two parallel scalers 63 and 64, an overflow detector 65, and an exponent processor 66 are added.

The scalers 63 and 64 shift the mantissas of the two floating point numbers to be added so that bits of equal significance are added together. Such scalers are well known in the art; see, for example, U.S. Pat. No. 3,800,130 (Martinson et al.) for an illustration and description of one type.

The overflow detector 65 determines the position of the most-significant bit (MSB) in the output mantissa, so that it can be left-justified before storage in the X-Y memory. Left-justification of the output mantissa preserves the accuracy of the element because the maximum number of significant bits will be stored in the result memory (X-Y memory 47 in FIG. 4). The overflow detector 65 will be described below in detail.

The exponent processor 66 determines the output exponent, provides information for mantissa scaling, and adjusts the output exponent for left-justification of the mantissa. The exponent processor 66 will be described below in detail.

The bit parallel multiplier is well known in the art; see, for example, C. Ghest "Multiplying Made Easy for Digital Assemblies," Electronics, Nov. 22, 1971, pp. 56–61.

Bit parallel adders are well known in the art and are commercially available as integrated circuits. An example is Signetics type Ser. No. 74181 logical function integrated circuit.

The overflow detector 65, used in floating point computations, locates the MSB of the output mantissa so that the mantissa can be left-justified and the output value exponent correspondingly adjusted.

In one embodiment of the invention, the binary point is after the MSB of the input mantissas. The mantissa therefore represents a value between decimal values 1 and 2. The unjustified output mantissa for the example polynomial $$(Y = W_0 + W_1X_1 + W_2X_2 + W_3X_1X_2 + W_4X_1^2 + W_5X_2^2)$$

is a minimum of decimal 1 (when all terms except one are zero and all mantissas in the non-zero term are decimal 1) and a maximum of decimal 34 (all mantissas decimal 2). The MSB can be located in any of six possible positions in the output mantissa word.

Figure 7:
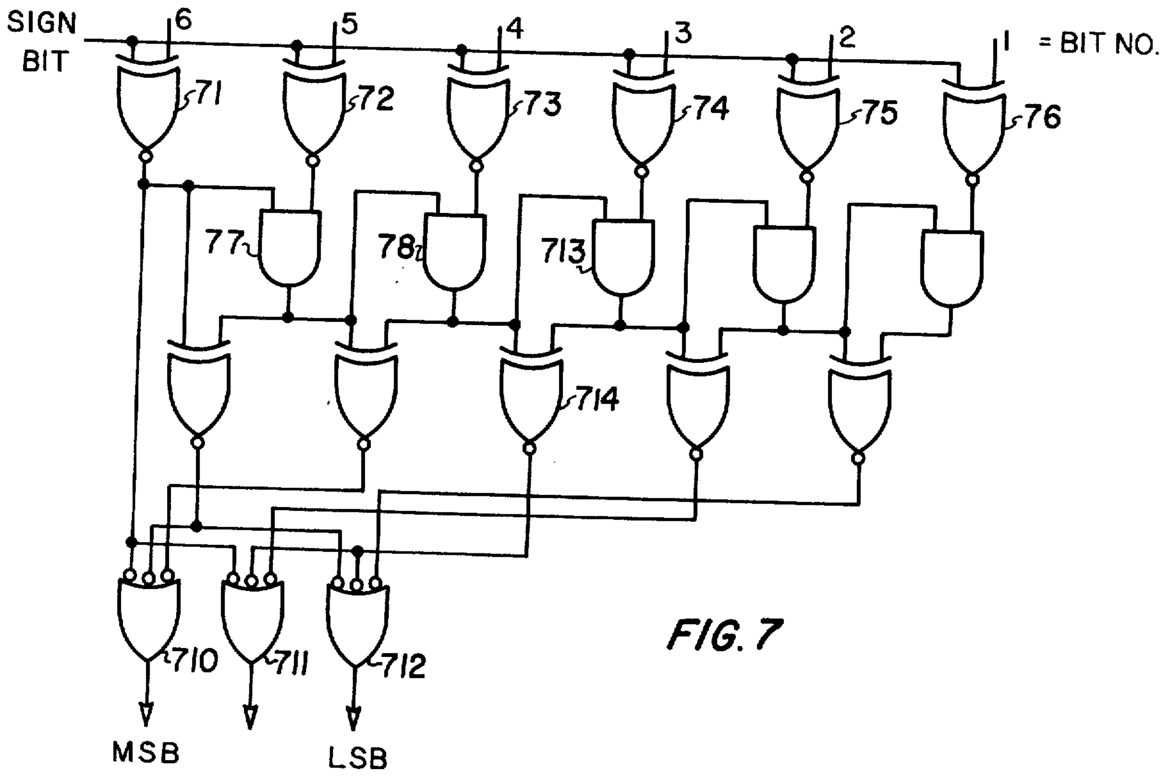
FIG. 7 is a logic diagram of an overflow detector.

The circuit of FIG. 7 determines the position of the MSB for a two's-complement form number; it is the first bit from left to right which disagrees with the sign bit. The output signal is a binary number corresponding to the position of the MSB, which is used to control the scaler 63 of FIG. 6 when the output mantissa is recirculated through this scaler. The number of overflow bits is added to the output exponent to correct for this operation.

Each input bit is applied to a different one of a group of exclusive NOR gates 71–76 of FIG. 7, the other input of which is the sign bit. The highest order exclusive NOR gate 71 will be activated if the input bit six is different from the sign bit. The output of the exclusive NOR gate 71 will inhibit the AND gate 77, whose output signal then inhibits another AND gate 78 which corresponds to a next lower order input bit. In a similar way, all the lower order AND gates are inhibited. The low output signal from the exclusive NOR gate 71 is applied to the input terminals of the NAND gates 710 and 711. The NAND gates 710–712 encode the output of the overflow detector logic circuit to produce a binary number which indicates the number of overflow bits. The output signal from the NAND gate 710 is the most significant bit of the binary number and the output signal from the NAND gate 712 is the least significant bit. In the example just cited, the input signals to the NAND gates 710 and 711 will be low, causing the NAND gates 710–712 to encode an output value of six.

If the first bit that differs from the sign bit is input bit number three, the output signal of the exclusive NOR gate 74 will be low, inhibiting the AND gate 713. The output of the exclusive NOR gates 71, 72 and 73 will all be high so that the AND gate 77 will be enabled, which in turn will enable the AND gate 78 and apply a high signal to one input of the exclusive NOR gate 714. The other input of the exclusive NOR gate 714 is the output of the disabled AND gate 713 (due to the low output signal of the exclusive NOR gate 74) so that the output signal of the exclusive NOR gate 714 will be low enabling the output signal of the NAND gates 711 and 712. This encodes a binary three.

From the above description, it can be seen how the number of overflow bits will be detected by the circuit of FIG. 7. The output signals of the overflow detector in FIG. 7 control the scaler 63 of FIG. 6 as described above.

Figure 8:
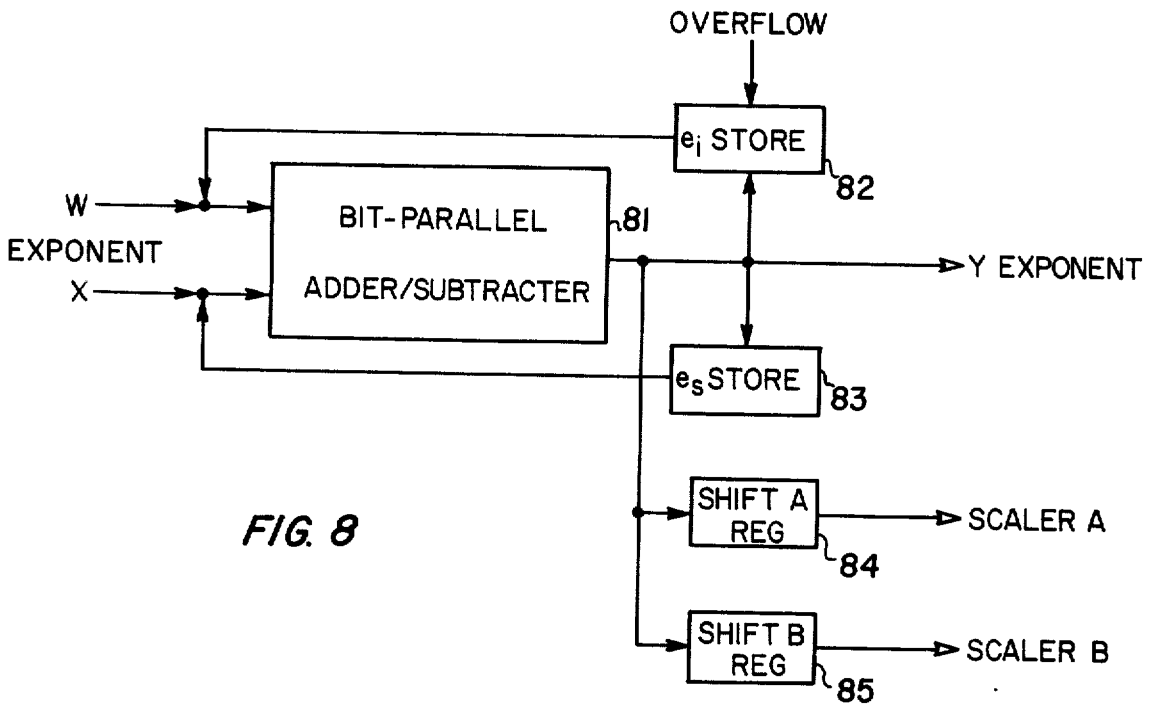
FIG. 8 is a block diagram of an exponent controller.

The exponent processor 66 in FIG. 6 is shown in detail in FIG. 8. The exponent processor comprises a bit-parallel adder/subtractor 81 and four bit-parallel memories 82–85.

The $e_i$ store 82 retains the exponent value for the current (i-th) term of the polynomial, while the $e_s$ store retains the exponent for the number already in the accumulator of FIG. 6. The exponent processor loads the scaler registers 84 and 85 with the necessary shift information so that each new term may be properly added to the accumulator contents, and the processor keeps track of the accumulator exponent. When all terms have been accumulated, the $e_s$ exponent is adjusted for the mantissa left-justification and gated to the X-Y memory.

The exponent of the term being processed is gated into the $e_i$ store 82. The $e_s$ store 83 contains the exponent of the values stored in the accumulator of the bit parallel adder 62 (FIG. 6). The values from the stores 82 and 83 are gated to the input of the bit parallel adder subtractor 81 and the smaller is subtracted from the larger. The difference is set into the shift A register 84 or the shift B register 85 depending on whether $e_i$ or $e_s$ is larger. When left-justifying the result, the output (Y) exponent is taken directly from the output terminals of the adder subtractor 81.

Returning now to FIG. 6, the operation of the bit parallel arithmetic processor can be described as follows. The mantissa of the numbers from the W memory and X memory are gated from the memory to the bit parallel multiplier 61. The W value is gated to one input of the multiplier through the gate network 610, the other gate networks 611 and 612 and 613 being inhibited. The exponents of the W and X values are gated to the exponent processor 66. When the W and X values are to be multiplied, the exponents are added by the exponent processor 66.

If the W value is to be added to the output product from the multiplier 61, the gating network 612 is enabled to couple the W value to the scaler A 63. The W exponent is then shifted to the $e_i$ store in the exponent processor 66. The input bits to the scalers 63 and 64 are adjusted so that bits of equal significance are added in the bit parallel adder 62.

If the output of the adder 62 is the result (Y) mantissa, the gating networks 610–612 are disabled and the gating network 613 is enabled to couple the Y mantissa from the output of the adder 62 to the input of the scaler 63. The overflow circuit 65 is activated to indicate the number of overflow bits and provide a control signal to the scaler 63 which will left-justify the mantissa. The overflow circuit 65 also provides a signal to the exponent processor which increments the $e_s$ exponent by the number of overflow bits detected by the overflow circuit 65.

The invention described can be used as an auxillary computing element to a general purpose computer. Various functions can be more rapidly calculated by using specialized hardware as shown than by programming the general purpose computer. Various problems for which the described invention is useful are shown, for example, by L. O. Gilstrap, Jr., "Keys to Developing Machines With High Level Artificial Intelligence," ASME Paper 71DE-21, presented at the Design Engineering Conference Show, New York, N.Y., Apr. 19, 1971, and by A. G. Ivakhnenko, "Polynomial Theory of Complex Systems," IEEE Transactions, SMC-1 No. 4, Oct. 1971, pp. 364–378.

Various modifications to the systems and circuits described and illustrated to explain the concepts and modes of practice of the invention might be made by those of ordinary skill in the art within the principle or scope of the invention as expressed in the appended claims.

What is claimed is:

1. A circuit for evaluating arbitrarily complex multinomial expressions comprising in combination:

a plurality of multiplier-added cells, each cell having three input ports for receiving electrical signals representing, respectively, a multiplicand, a multiplier, and an addend, and an output port for producing electrical output signals representing the product of the multiplier and multiplicand which product is added to the addend;

a plurality of selector means coupled to receive electrical input signals, representing variables and coefficients, for coupling the input signals to the input ports of each cell in response to control signals; and control means for applying said control signals to said selector means to produce the desired multinomial values at the output ports of said cells.

2. The invention as claimed in claim 1 wherein said input signals of said selector means includes the output signals from said cells.

3. The invention as claimed in claim 1 wherein said selector means and said control means comprise the combination of:

first memory means responsive to addressing signals for coupling stored electrical signals representing multinomial coefficient values to selected input ports of said cells;

second memory means responsive to addressing signals for coupling stored electrical signals representing input variables to selected input ports of said cells and for storing electrical signals from the output ports of said cells;

control memory means for storing addressing signals and polynomial select signals;

controller means responsive to elementary operation words for retrieving said address signals and polynomial select signals from said control memory means and for applying said address signals to said first and second memory means; and elementary operation word memory means responsive to said polynomial select signals for supplying elementary operation words to said controller means.

* * * * *